UNITED STATES PATENT OFFICE.

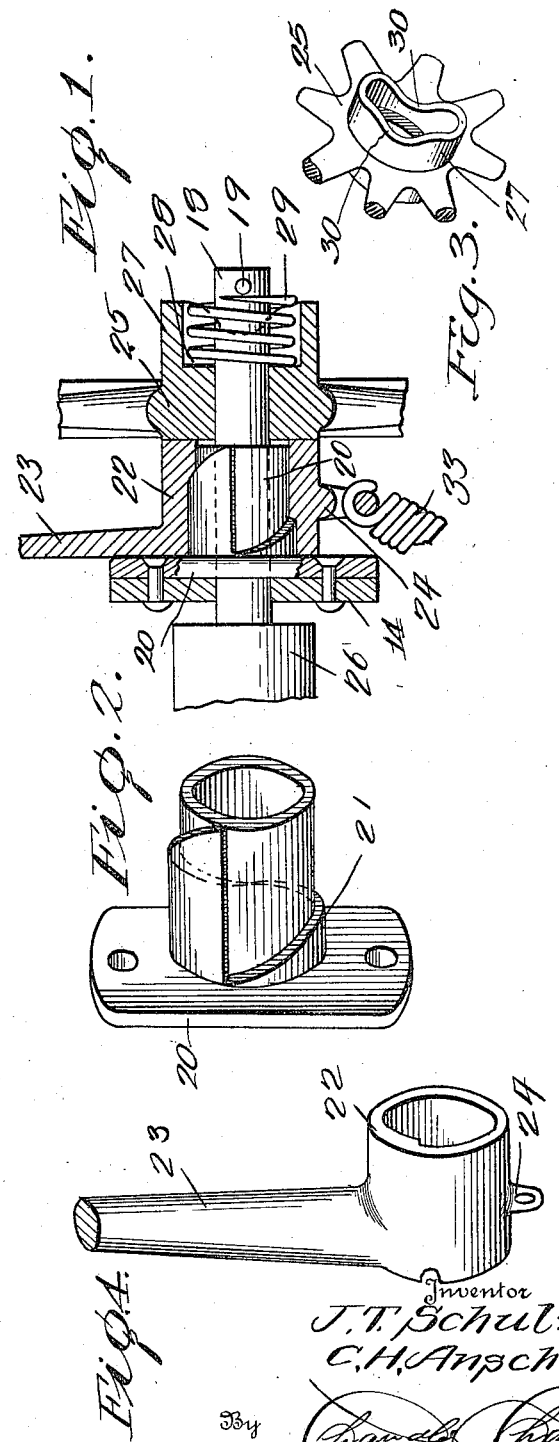

CARL H. ANSCHUTZ, OF WILSON, AND JOHN T. SCHULZ, OF GAYLORD, KANSAS.

CLUTCH DEVICE.

1,181,363.      Specification of Letters Patent.      Patented May 2, 1916.

Application filed June 3, 1914. Serial No. 842,646.

*To all whom it may concern:*

Be it known that we, CARL H. ANSCHUTZ and JOHN T. SCHULZ, citizens of the United States, residing, respectively, at Wilson, in the county of Ellsworth and State of Kansas, and Gaylord, in the county of Smith, State of Kansas, have invented certain new and useful Improvements in Clutch Devices; and we do hereby declare the following to be a full, clear, and exact description of the invention, such as will enable others skilled in the art to which it appertains to make and use the same.

This invention relates to clutch devices.

The object of the invention is to provide a clutch device which will be simple in construction and efficient in use.

With the above and other objects in view the invention consists in the details of construction and in the arrangement and combination of parts to be hereinafter more fully described and particularly pointed out in the appended claim.

In describing the invention in detail reference will be had to the accompanying drawings wherein like characters of reference denote corresponding parts in the several views, and in which—

Figure 1 is a longitudinal section through a clutch device constructed in accordance with the invention; Fig. 2, a detail perspective view of the threaded bearing employed in the clutch device; Fig. 3, a perspective view of the constantly driven sprocket wheel employed in the clutch device, and Fig. 4, a perspective view of the interiorly threaded sleeve which coöperates with the threaded bearing.

Referring to the drawings 26 indicates the driven member of the device in the form of a roller having an extended trunnion 18 which carries in its extreme outer end a transverse pin 19. The trunnion 18 of the member 26 is adapted to rotate in a suitable bearing 20 which is secured to a fixed element 14. The bearing 20 is threaded as at 21 and engaged with the threads 21 is an interiorly threaded sleeve 22 provided with diametrically opposite lateral arms 23 and 24. Loosely mounted on the trunnion 18 between the bearing 20 and the pin 19 is a sprocket wheel 25 which is adapted to be connected to a suitable source of power and constitutes the driving member of the clutch device. The hub of the sprocket wheel 25 is extended at its outer end as at 27 and this extended portion is enlarged to form a shoulder 28. Surrounding the trunnion 18 between the shoulder 28 and the pin 19 is a spring 29 which constantly tends to move the sprocket wheel 25 and its hub 27 toward the sleeve 22. The end of the hub 27 adjacent the pin 19 is provided with diametrically opposite recesses 30 which are adapted to receive the pin 19 under certain conditions and lock the trunnion 18 to the sprocket wheel 25 so that said trunnion and the member 26 will partake of the rotation of the sprocket wheel.

In the operation of the device it will be observed that the sleeve 22 is normally held in the position shown in Fig. 1 by means of a spring 33 one end of which is secured to the arm 24 and its other end to a suitable fixed member. In its normal position the sleeve is disposed so that the sprocket wheel 25 can be moved laterally by the spring 29 a sufficient distance to disengage the pin 19 from the recesses 30. When the pin 19 is thus disengaged from the recesses 30 it will be obvious that the sprocket wheel 25 will run idle. By rotating the sleeve 22 through the medium of a suitable connection with the arm 23 it will be apparent that owing to the threaded engagement of this sleeve with the bearing 20 the sleeve will be moved outwardly and in turn force the sprocket wheel 25 outwardly so as to engage the pin 19 in the recesses 30 and thus connect the sprocket wheel to the member 16 to effect rotation of the latter. As soon as the arm 23 is released the parts will assume their normal position.

What is claimed is:—

In a device of the class described the combination of a bearing having its exterior threaded, a driven member rotatably mounted in the bearing, a driving member loosely mounted on the driven member and adapted to be moved longitudinally thereof, a cross pin extending through the driven member adapted to engage in recesses in the driving member when the latter is moved longitudinally of the driven member, spring means normally holding the driving member in position to disengage the cross pin from said recesses, and a sleeve threaded on said bearing adapted when rotated in one direction to engage the driving member and move same longitudinally of the driven member to lock said members together.

In testimony whereof, we affix our signatures, in the presence of two witnesses.

CARL H. ANSCHUTZ.
JOHN T. SCHULZ.

Witnesses:
H. J. DANNENBERG,
ERNEST ANSCHUTZ.

Copies of this patent may be obtained for five cents each, by addressing the "Commissioner of Patents, Washington, D. C."